United States Patent [19]
Colozza

[11] Patent Number: 5,244,508
[45] Date of Patent: Sep. 14, 1993

[54] SELF-DEPLOYING PHOTOVOLTAIC POWER SYSTEM

[75] Inventor: Anthony J. Colozza, Lakewood, Ohio

[73] Assignee: The United States of America as represented by the Administrator of the National Aeronautics and Space Administration, Washington, D.C.

[21] Appl. No.: 862,113

[22] Filed: Apr. 2, 1992

[51] Int. Cl.[5] .......................................... H01L 31/045
[52] U.S. Cl. ..................................... 136/245; 136/292
[58] Field of Search ................. 136/245, 292; 244/173

[56] References Cited

U.S. PATENT DOCUMENTS

| | | | |
|---|---|---|---|
| 3,635,425 | 1/1972 | Swet | 244/173 |
| 3,735,943 | 5/1973 | Fayet | 244/173 |
| 3,929,510 | 12/1975 | Kittl | 136/206 |
| 4,031,674 | 6/1977 | Rand | 52/2 |
| 4,282,394 | 8/1981 | Lackey et al. | 136/245 |
| 4,293,731 | 10/1981 | Schweig et al. | 136/248 |
| 4,421,943 | 12/1983 | Withjack | 136/246 |
| 4,713,492 | 12/1987 | Hanak | 136/245 |
| 4,728,878 | 3/1988 | Anthony | 322/2 R |

Primary Examiner—Aaron Weisstuch
Attorney, Agent, or Firm—Gene E. Shook; James A. Mackin; Guy M. Miller

[57] ABSTRACT

A lightweight flexible photovoltaic (PV) blanket is attached to a support structure of initially stowed telescoping members. The deployment mechanism comprises a series of extendable and rotatable columns. As these columns are extended the P.V. blanket is deployed to its proper configuration.

19 Claims, 3 Drawing Sheets

SELF-DEPLOYING PHOTOVOLTAIC POWER SYSTEM

ORIGIN OF THE INVENTION

The invention described herein was made in the performance of work under a NASA contract and is subject to the provisions of Section 305 of the National Aeronautics & Space Act of 1958, as amended, (42 USC 2457).

TECHNICAL FIELD

This invention is directed to a portable power collection device that utilizes a flexible photovoltaic blanket connected to a support structure. The invention is particularly directed to a foldable photovoltaic array that is extendable from a stowed mode to a deployed mode as the various members of the support structure move from a retracted position to an extended position.

The ability to establish an outpost or base in an isolated, harsh environment is initially dependent on the availability of an adequate power source. The ideal power supply requires very little implementation time and has a high reliability for operation. For space based applications the power source needs to be lightweight and capable of being stowed in a relatively small volume. One power source which can meet these requirements is a photovoltaic (PV) array system.

It is, therefore, an object of the present invention to provide a photovoltaic (PV) array that is easily transported to a remote location when it is in a folded or stowed mode.

It is a further object of the invention to provide a supporting structure for a foldable photovoltaic (PV) array that is extendable from a retracted mode to unfold the array.

BACKGROUND ART

U.S. Pat. No. 3,929,510 to Kittl describes a system for converting solar radiation into useful electric energy which includes a silicon cell and solar radiation conversion means integral with or spaced from the silicon cell. U.S. Pat. No. 4,031,674 to Rand is directed to an inflatable tent which is in the shape of a non-planar tetrahedron that is formed from a single rectangular sheet joined with itself along three linear seams. U.S. Pat. No. 4,293,731 to Schweig et al discloses a solar generator which comprises a plurality of lightweight sheets or panels assembled especially for spacecraft. The panels carry photocells, and the supporting structure may be folded. U.S. Pat. No. 4,421,943 to Withjack is concerned with a collapsible mobile solar energy power source having pivotally mounted solar panels. U.S. Pat. No. 4,713,492 to Hanak discloses a stowable large area solar photovoltaic power module comprising a plurality of flexible large area solar panels interconnected by a flexible hinge. U.S. Pat. No. 4,728,878 to Anthony describes a solar energy electric generating system for space vehicles which directly generates alternating current from ambient light without the use of inefficient power conversion.

DISCLOSURE OF THE INVENTION

The objects of the invention are achieved by an extremely lightweight flexible photovoltaic blanket attached to a support structure of initially stowed telescoping cylinders. Upon autonomous deployment the device provides electric power.

The device utilizes a photovoltaic PV blanket attached to I-beams held in a proper orientation by extendable columns which act as a deployment mechanism. This deployment is accomplished by the use of compressed gas.

The deployment mechanism of the array uses of a series of extendable and rotating columns. As the columns extend under the force of pressurized gas, the PV blanket is deployed to its proper configuration. Once fully extended these columns lock into place enabling them to serve as structural members to support the array.

BRIEF DESCRIPTION OF THE DRAWINGS

The objects, advantages and novel features of the invention will be more fully apparent from the following detailed descriptions when read in connection with the accompanying drawings wherein like numerals are used throughout identified like parts.

BEST MODE FOR CARRYING OUT THE INVENTION

Figure 1:
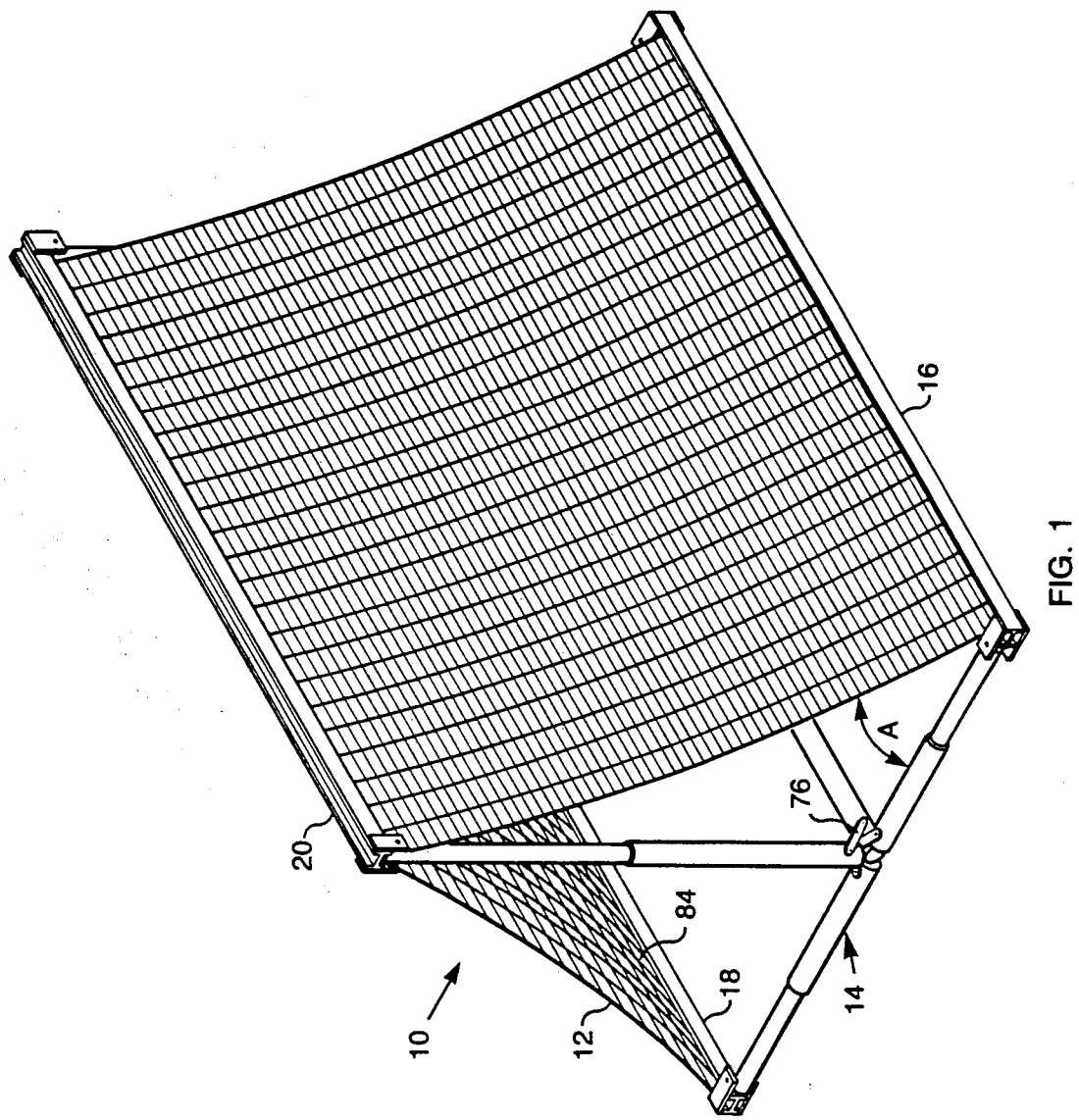
FIG. 1 is a perspective view showing a photovoltaic (PV) array constructed in accordance with the present invention with its supporting structure extended to a deployed mode.

Referring now to the drawings, there is shown in FIG. 1 a photovoltaic power system 10 constructed in accordance with the present invention in a deployed mode. The system 10 comprises a photovoltaic (PV) blanket array 12 carried by a support structure 14 formed by a combination of cables, beams, and columns to support and deploy the PV blanket 12. The cables which are used to support the PV blanket 12 are attached to parallel "I" beams. The beams are held in their proper orientation by the columns which also act as the deployment mechanism for the array. The columns consist of a series of hollow telescoping cylinders. Once extended these cylinders lock into place. The locking mechanism uses a spring loaded pin which extends through a hole at the end of the previously extended cylinder.

Figure 2:
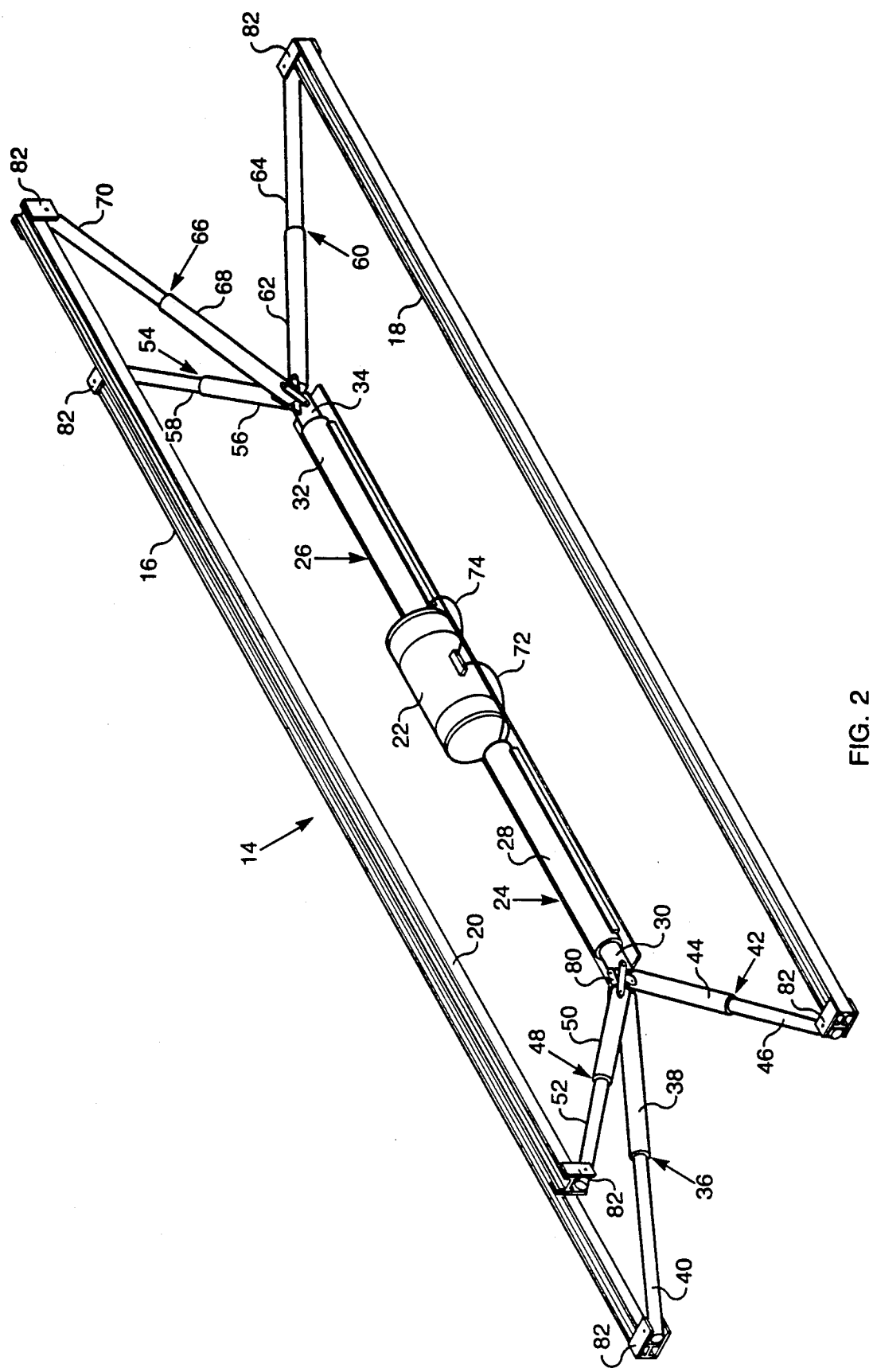
FIG. 2 is a perspective view of the array support structure constructed in accordance with the present invention showing the various structural members retracted to a stowed mode.

Deployment of the array from a stowed mode shown in FIG. 2 is accomplished by the use of compressed gas. This gas is released into the columns from a storage tank located at the base of the array. As the gas is channeled into the columns, they extend, thereby deploying the PV blanket. The array is stowed with the blanket either folded or rolled, depending on the particular blanket's flexibility. The roll out storage technique is preferable because it allows for easier repackaging if the array needs to be returned to its stowed configuration.

Figure 3:
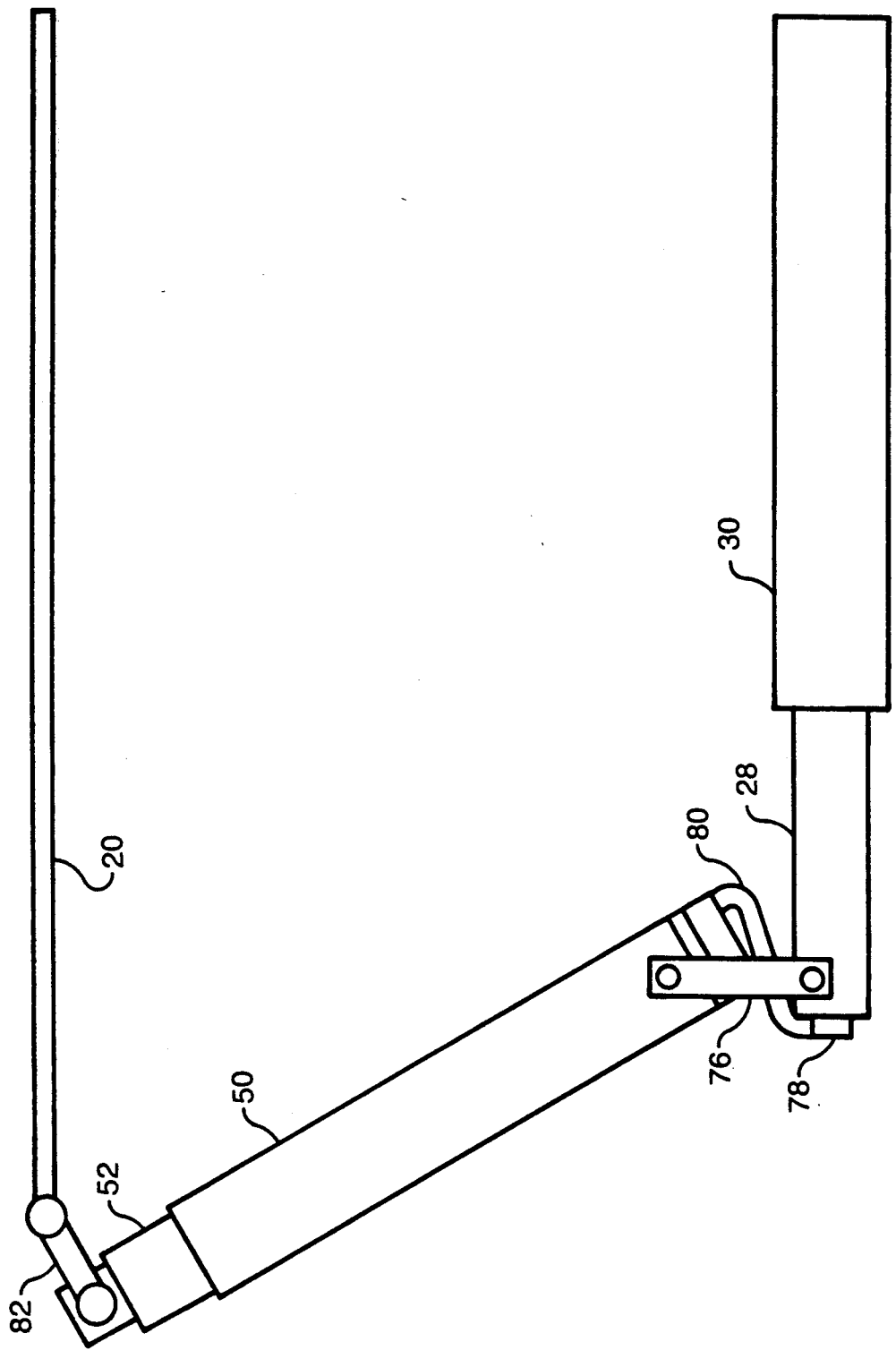
FIG. 3 is an enlarged elevation view of a portion of the supporting structure of FIG. 1 showing the linkage between primary and secondary columns.

The columns which are used for both deployment and structural support can be categorized into two types, the initial deployment columns and the secondary deployment columns. The initial deployment columns are used to orient the secondary columns which deploy the PV blanket. In order for the deployment to occur, the secondary columns must be capable of rotating into their proper orientation as they are being moved outward. This rotation is performed with the use of brackets that connect the initial columns to the secondary columns. These brackets enable the secondary columns to have one rotational degree of freedom. The connection bracket also houses the pressure lines that allow the pressurized gas to pass from the initial columns to the secondary ones. The connection bracket and pressure lines between the columns is shown in FIG. 3.

Referring now to FIG. 2, the support structure 14 that is used to unfold the PV blanket 12 is shown in the retracted position forming the stowed mode. The PV blanket 12 is not shown so that the various parts of the support structure 14 can be illustrated.

Opposite ends of the PV blanket 12 are secured to opposed side rail supports 16 and 18, which are parallel to one another in close relationship as shown in FIGS. 1 and 2. A top rail support 20 which is parallel to the supports 16 and 18 engages a centrally disposed portion of the PV blanket 12. The rail supports 16,18, and 20 are substantially rigid in that they do not extend or elongate and are in the form of I beams having fixed lengths.

As best shown in FIG. 2, the remaining portions of the supporting structure 14 comprise elongatable members or columns in the form of telescoping cylinders operably connected to a centrally disposed pressurized tank 22. Along these lines, aligned elongatable members 24 and 26 form primary cylinders which extend from opposite ends of the tank 22. The elongatable member 24 comprises an outer cylinder 28 having an inner cylinder 30 slidably mounted therein which acts as a piston. Likewise, the elongtable member 26 has an outer cylinder 32 containing an inner cylinder 34 which also forms a piston.

An elongatable member 36 or secondary cylinder has one end operably connected to an end of the side rail support 16 and its opposite end operably connected to the elongatable member 24 or primary cylinder. More particularly, the elongatable member 36 includes an outer cylinder 38 having one end connected to the piston 30. An inner cylinder or piston 40 extends into the opposite end of the cylinder 38 for reciprocal movement. The outermost end of the piston 40 is operably connected to one end of the rigid side rail support 16.

In a similar manner, an elongatable member 42 or secondary cylinder connects one end of the side rail support 18 to the elongatable member 24 or primary cylinder. More particularly, the elongatable member 42 comprises an outer cylinder 44 having one end connected to the piston 30. An inner cylinder or piston 46 connected to an end of the rigid side rail 18 extends into the cylinder 44 for reciprocable motion.

The top rail 20 is similarly connected to the elongatable member 24 or primary cylinder by an elongatable member 48 or secondary cylinder. This elongatable member 48 includes an outer cylinder 50 having one end connected to the piston 30. An inner cylinder or piston 52 having one end connected to the rigid top rail extends into the cylinder 50 for sliding movement.

The opposite end of the side rail support 16 is operably connected to the elongatable member 26 or primary cylinder by an elongatable member 54 or secondary cylinder. As best shown in FIG. 2, the elongatable member 54 includes an outer cylinder 56 having one end connected to the piston 34. An inner cylinder or piston 58 having one end connected to the end of the side rail 16 extends into the outer cylinder 56 for sliding movement.

The end of the side rail support 18 is connected to the elongatable member 26 or primary cylinder by an elongatable member 60 or secondary cylinder which comprises an outer cylinder 62 having one end connected to the piston 34 and containing an inner cylinder or piston 64 slidably mounted therein with its outermost end connected to the end of the side rail 18. The end of the top rail 20 opposite the end connected to the piston 52 is operably connected to the elongatable member 26 or primary cylinder by an elongatable member 66 or secondary cylinder which includes an outer cylinder 68 having one end mounted on the piston 34. An inner cylinder or piston 70 having one end connected to the outermost end of the top rail 20 extends into the outer cylinder 68 for reciprocable motion.

When the supporting structure in the stowed mode shown in FIG. 2 with the folded photovoltaic array attached is located in the desired position, it is extended to a deployed mode by channeling pressurized gas from the tank 22 to the extendable members causing them to extend. This deploys the PV blanket from a stowed configuration to the deployed mode shown in FIG. 1.

This extension is accomplished by channeling pressurized gas from the tank 22 through lines 72 and 74 to the primary cylinders 28 and 32, respectively. This pressure in these cylinders results in the extensions of the primary pistons 30 and 34, respectively, as shown in FIG. 3. When the primary pistons 30 and 34 are fully extended, spring activated locking pins (not shown) within the primary cylinders 28 and 32 secure the primary pistons 30 and 34 in the extended positions, respectively.

As the piston 30 extends outward from the primary cylinder 28, the extendable members 36,42, and 48 or secondary cylinders rotate about the end of the piston 30 because of the hinged connection provided by a bracket 76 which pivotally mounts the outer cylinders 38,44, and 50 to the piston 30, as shown in FIG. 3. When the piston 30 is fully extended, the outer cylinders 38,44, and 50 extend at right angles to the piston 30 and to each other, as shown in FIG. 1.

When the primary piston 30 is fully extended relative to the primary cylinder 28 and locked into the extended position, pressurized gas continues to flow from the primary cylinder 28 through a passage in the inner cylinder piston 30 to a pressure valve 78. Upon attaining a predetermined pressure the gas is admitted to a line 80 shown in FIG. 3, where it flows to the interior of the secondary cylinder 50. This pressurized gas forces the secondary piston 52 to move from the retracted position shown in FIGS. 3 to the extended position shown in FIG. 1. A bracket 82 which is similar to the bracket 76 hingedly connects the end of the secondary piston 52 to the top rail support 20, as shown in FIG. 3. When the piston 52 is fully extended out of the cylinder 50 to the position shown in FIG. 1, it is locked into the fully extended position by a spring activated locking pin (not shown).

It will be appreciated that the elongatable members 36 and 42 or secondary cylinders are extended in a similar manner to move the side rail supports 16 and 18 away from the stowed mode shown in FIG. 2 wherein these rail supports are in close proximity to each other to a deployed mode shown in FIG. 1 wherein the side rail supports are spaced from one another. It will also be appreciated that the elongatable members 54, 60, and 66 or secondary cylinders at the opposite end of the support structure 14 operate in a manner similar to that shown and described in FIG. 2. The PV blanket is supported in the structure 14 by a plurality of cables 84 shown in FIG. 1.

Several types of PV blankets including GaAs/Ge, GaAs cleft, and silicon may be used. The PV blanket's shape has been determined by an optimization of a reduction in the tension of cables 84. Once the blanket shape is established, the optimum array dimensions can be determined. The PV blanket shape and array dimensions characterize the array and set the optimum configuration for that array under the given environmental conditions.

The PV blanket has two parameters which can directly influence the analysis results. These are its specific mass and its energy conversion efficiency. The specific mass of the blanket directly affects the tension in the blanket support cables which influences the rest of the structural sizing. To determine the effect of a change in blanket weight on the design points, array specific mass for various types of PV blankets were calculated over a range of array sizes. Analyzing these calculations, it was determined that the minimum specific mass point, design point, is not dependent on blanket type.

The energy conversion efficiency is used only to determine an absolute value for the specific power of the array. Therefore it will not influence the design characteristics, and it is not a factor in determining the design point for the array. The power performance, however, can be significantly affected by a more detailed modeling of the PV blanket power profile. The analysis used to determine the power profile for the various PV blankets was based on the normal component of solar radiation falling on the projected blanket area. The thermal variation of the blanket would tend to reduce the PV cell efficiency, whereas the reflected sunlight from the surroundings would increase the array output. Therefore, these two factors would be working against each other, and minimize each others affect.

The interaction between the blanket cover glass and the solar radiation can also affect the power output. At high solar incidence angles most of the solar radiation is reflected. The amount of radiation reflected in this manner through a day cycle depends on both the cover glass properties and the blanket configuration. There are other PV blanket characteristics, such as PV cell packing factor and blanket tensile strength, which can affect the structural design and array specifications. On most PV blankets the cell packing factor is fairly high; therefore, this should not substantially degrade the assumed blanket performance.

The actual strength of the blanket can be a design consideration because the cables 84 are spaced every 0.5 m and the PV blanket must support its own weight between the cables. For very fragile PV blankets, such as amorphous silicon, it is very likely that some form of backing material would have to be used to help support the blanket. Another concern is that the curve of the blanket will produce a partial shading on the back side of the array. Consideration to the effect of shading on the blanket should be given since a partial illumination of a string of PV cells can short out the string. The blanket would have to be designed or orientated in such a way that the PV cell strings run parallel to the shading line.

Through the results of the analysis, various characteristics of the arrays become evident. For example the optimum end angle "A" shown in FIG. 1 is 0°. That is, the PV blanket should be allowed to hang as loose as possible while still maintaining a catenary shape. Beyond this, a portion of the PV blanket will be horizontal on the ground. This could be taken to its extreme by allowing the PV blanket to hang loose enough to form an upside down "T" shape. The results suggest that the specific power of the array continues to increase beyond the 0° end angle mark. Before conclusions like this are drawn, certain points must be considered. The power profile of a PV blanket with this shape must be examined to determine how it varies throughout the day.

The dimension of the array which produces the optimum configuration is dependent on blanket end angle, array width tent angle, and structural material. Other factors, such as blanket type and wind velocity, only affect the array performance specifications, but do not change the design point. In operation, an initial pressure valve located on the pressure tank 22 is opened by remote control. This valve has the ability to be closed remotely if a problem should arise during deployment and, if necessary, it can be operated manually.

The pressurized gas enters the initial deployment cylinders 24, 26 causing them to extend. As the initial columns extend the secondary columns are pushed and rotated into their deployment configuration. As the secondary columns are moved the PV blanket 12 begins to unfold or unroll depending on the storage method. A small wheel may be provided at the end of each column in contact with the support surface to facilitate easier movement of the column over this surface.

Once the initial deployment columns are extended, the array is in a semi-deployed configuration and the sequence is halted until the next series of valves are opened. These valves are located along the pressure lines connecting the initial columns to the secondary columns. The array may be visually inspected to insure that no component is binding or in any other way inhibited from extending before the deployment is continued.

Once full deployment is achieved the array may be examined to insure the deployment was successful and that all cylinders are locked. As a safety precaution, the valves would then be moved to their vent position to depressurize the columns. A guy wire may be connected to the vertical columns and to the ground to stabilize the structure. The structure itself may also be secured to the support surface so that it is not moved or toppled by the wind. The array is now ready to be connected to the power management and distribution system.

If it is required, the array can be manually retracted into its stowed position. This is done by pushing in the locking pins on the cylinders to allow them to collapse. As the array is being retracted the PV blanket will roll back onto a spring loaded storage roll or be folded back into its storage configuration. Once stowed, the valves can be reset and the pressurized gas tank recharged so the array can be used again.

While the preferred embodiment of the invention has been shown and described, it will be appreciated that various structural modifications may be made to the structure without departing from the spirit thereof or the scope of the subjoined claims.

What is claimed is:

1. Apparatus for extending a foldable photovoltaic array from a stowed mode to a deployed mode, comprising a plurality of elongatable members comprising primary cylinders and secondary cylinders,
   each of said primary cylinders having a piston mounted for reciprocating motion with one end in the primary cylinder and the other end connected to one of said secondary cylinders,
   each of said secondary cylinders having a piston mounted for reciprocating motion with one end of the piston in said secondary cylinder,
a plurality of rigid members operably connected to said plurality of elongatable members,
   each of said rigid members being connected to the other end of one of said pistons having one end in one of said secondary cylinders,
   means for moving said elongatable members from a retracted to an extended position, and
   means for connecting said rigid members to said array whereby said array extends from said stowed mode to said deployed mode as said elongatable members move to said extended position.

2. Apparatus as claimed in claim 11 wherein said primary cylinders comprise a pair of cylinders 180° disposed from each other and separated by a fluid pressure source at one end, and each primary cylinder being connected to said secondary cylinders at the other end by a movable bracket.

3. Apparatus as claimed in claim 2 wherein a continuous fluid transmitting conduit is provided from said fluid pressure source through said primary cylinders and said movable brackets to said secondary cylinders.

4. Apparatus as claimed in claim 3 wherein fluid is transmitted through said fluid transmitting conduit thereby moving the pistons mounted within said primary cylinders from a retracted position to an extended position.

5. Apparatus as claimed in claim 4 wherein the secondary cylinders rotate from said retracted position to an angular position through one degree of rotational freedom as the primary cylinders move from the retracted position to the extended position.

6. Apparatus as claimed in claim 5 wherein the secondary cylinders form a 90° angle with the extended primary cylinders when said primary cylinders are fully extended.

7. Apparatus as claimed in claim 6 wherein the secondary cylinders comprise two horizontal cylinders within the horizontal plane of a primary cylinder and one vertical cylinder in the vertical plane of said primary cylinder when said secondary cylinders are in said extended position.

8. Apparatus as claimed in claim 7 wherein fluid is transmitted through said fluid transmitting conduits in said primary cylinders to said fluid transmitting conduits in said secondary cylinders through said movable brackets when said secondary cylinders are in said retracted position and said primary cylinders ar in said extended position.

9. Apparatus as claimed in claim 8 wherein said pistons in said secondary cylinders move from said retracted position to said extended position as said fluid moves through said fluid transmitting conduit.

10. Apparatus as claimed in claim 9 wherein said rigid members move from said stowed mode to said deployed mode as the secondary cylinders move from said retracted position to said extended position.

11. Apparatus as claimed in claim 10 wherein said rigid members comprise at least two horizontal fixed length members in the horizontal plane of said primary cylinders and at least one other fixed length member in a plane which intersects the plane of said primary cylinders.

12. Apparatus as claimed in claim 11 wherein a said photovoltaic array is connected between said other rigid member and said two horizontal rigid members by an array support means.

13. Apparatus as claimed in claim 12 wherein said array support means comprises a plurality of support cables securely connected between said other rigid member and said two horizontal rigid members.

14. Apparatus as claimed in claim 13 wherein said support cables are uniformly interspersed between the arrays throughout the length of said rigid members.

15. In apparatus for extending a foldable photovoltaic array from a stowed mode of the type wherein a pair of parallel single rail supports are operably connected to opposed ends of said array and a centrally disposed rail support engages said array between said opposed ends,
   means for moving said side rail supports from a first position adjacent one another when said array is in the stowed mode to a second position wherein said parallel side rail supports are spaced from each other a predetermined distance, and
   means for moving said top rail support from one position adjacent to said parallel side rail supports when said array is in the stowed mode to another position spaced from said parallel side rail supports whereby said array is extended to a deployed mode.

16. Apparatus as claimed in claim 15 wherein the means for moving said side rail supports and said top rail support includes at least one elongatable member movable from a retracted position to an extended position to move said side rails toward said second position and said top rail toward said other position.

17. Apparatus as claimed in claim 16 wherein the means for moving said side rail support and said top rail support includes a plurality of other elongatable members, each having one end operably attached to said one elongatable member and an opposite end operably connected to one of said rail supports.

18. A method of extending a foldable photovoltaic array from a stowed mode to a deployed mode comprising,
   securing oppositely disposed edges of said array to a pair of elongated side support members in adjacent parallel relationship,
   positioning another elongated support member between said side support members in engagement with a centrally disposed portion of said array,
   moving said side support members away from each other to a predetermined position wherein said side support members are in spaced parallel relationship whereby said oppositely disposed edges of said array are spaced from each other, and
   moving said other elongated support member away from said side support members while maintaining the same substantially parallel to said support members thereby moving said centrally disposed portion of said array away from said oppositely edges whereby said array assumes a triangular configuration.

19. A method of extending a foldable photovoltaic array as claimed in claim 18 wherein the support members are moved by a flowing fluid.

* * * * *